United States Patent

[11] 3,630,168

| [72] | Inventor | Foster C. Findlay |
| | | 909 Shattuck Road, Saginaw, Mich. 48604 |
| [21] | Appl. No. | 12,009 |
| [22] | Filed | Feb. 17, 1970 |
| [45] | Patented | Dec. 28, 1971 |

[54] INERTIA-OPERATED INDICATING APPARATUS
10 Claims, 3 Drawing Figs.

[52] U.S. Cl. .................................................. 116/114,
73/11, 200/61.45
[51] Int. Cl. ......................................................... G01d 21/00
[50] Field of Search............................................. 116/114,
114.29; 73/11, 12, 492; 200/61.45, 52, 61.47;
273/115, 116, 109, 110, 111, 112, 113, 114, 153 R

[56] References Cited
UNITED STATES PATENTS

| 796,427 | 8/1905 | Howland | 273/115 |
| 1,410,295 | 3/1922 | Hammond | 273/115 |
| 1,765,019 | 6/1930 | Maxwell | 273/153 |
| 1,842,384 | 1/1932 | Blanchard | 73/492 |
| 2,119,145 | 5/1938 | Zadig | 116/114 UX |
| 3,115,344 | 12/1963 | Thesisen | 273/116 |
| 3,154,774 | 10/1964 | Ochs | 200/61.45 X |
| 3,168,831 | 2/1965 | Wagner | 116/114 X |

*Primary Examiner*—Louis J. Capozi
*Attorney*—Learman, Learman & McCulloch

ABSTRACT: Inertia-operated apparatus for indicating unusually high rates of acceleration, deceleration and turning of a vehicle comprises a hollow body having three vertically stacked chambers, the upper and intermediate chambers having upwardly concave floors on which balls may be supported in such manner that one ball always is located at the center of the floor. The upper chamber includes a pair of ramps extending radially in opposite directions from the center of the floor and the intermediate chamber has a pair of ramps extending radially in opposite directions from the center of the floor, the ramps of the upper and intermediate chambers being normal to one another. At the upper end of each ramp is an opening which communicates with the lower chamber, and the lower chamber is provided with partitions to form four compartments, there being one compartment in communication with each of the openings in the ramps.

PATENTED DEC 28 1971

3,630,168

INVENTOR.
FOSTER C. FINDLAY

BY
Learman, Learman & McCulloch

INERTIA-OPERATED INDICATING APPARATUS

The invention disclosed herein relates to inertia-operated apparatus for indicating excessive rates of acceleration, deceleration and turning of a vehicle or the like and more particularly to inexpensive, purely mechanical apparatus for ascertaining whether or not a vehicle has been driven in an improper and unsafe manner.

It is common for the driver of a vehicle owned by another to abuse the vehicle in that he accelerates extremely rapidly, applies the brakes in such manner as to stop too quickly, and negotiates turns at excessive rates of speed. These practices not only subject the vehicle and parts thereof to excessive wear, but also endanger the lives of the occupants, and the lives and property of other persons in the vicinity of such a recklessly driven vehicle. Unless the driver of a recklessly driven vehicle is caught in the act, it is difficult for the vehicle owner to know that his vehicle is being driven improperly at any given time. The difficulty of assessing the driving habits of a vehicle driver has been recognized heretofore and various proposals have been made to provide some kind of monitoring apparatus. The apparatus heretofore proposed has not been particularly well received for the reason that it relies primarily upon electrically operated recording mechanisms which are expensive and somewhat delicate. Consequently, the utilization of such devices by individual vehicle owners has been extremely limited.

An object of this invention is to provide indicating apparatus for use in detecting improper operation of a vehicle and which is inexpensive and durable.

Another object of the invention is to provide indicating apparatus of the character described and which is capable of enabling any one of a number of improper driving practices may be detected.

A further object of the invention is to provide indicating apparatus of the character referred to and which is purely mechanical and is reusable repeatedly.

Other objects and advantages of the invention will be pointed out specifically or will become apparent from the following description when it is considered in conjunction with the appended claims and the accompanying drawings, in which:

Figure 1:
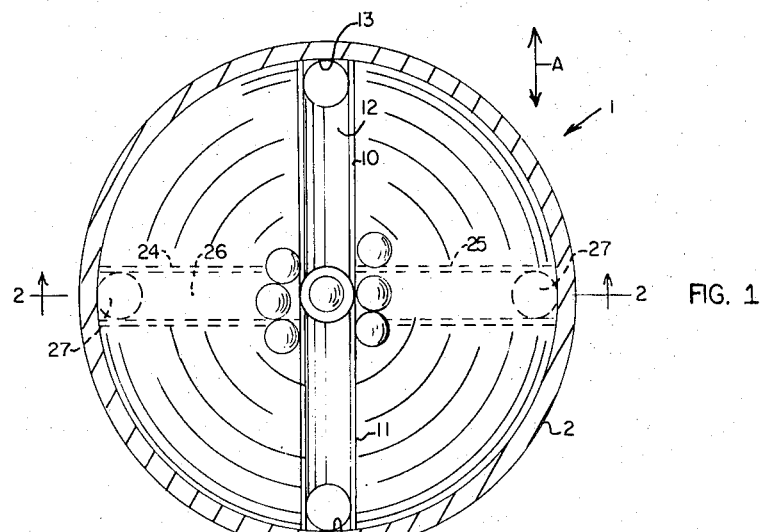
FIG. 1 is a transverse sectional view taken on the line 1—1 of FIG. 2.
Figure 2:
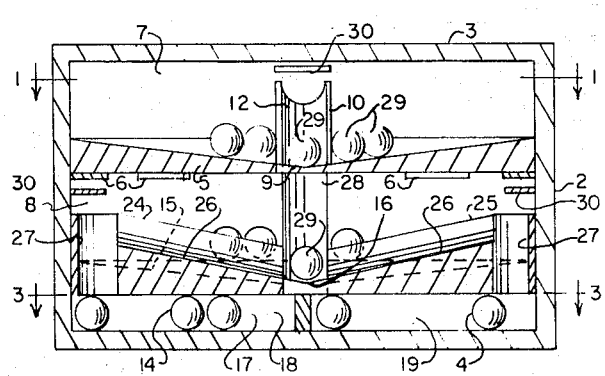
FIG. 2 is a vertical sectional view taken on the line 2—2 of FIG. 1.
Figure 3:
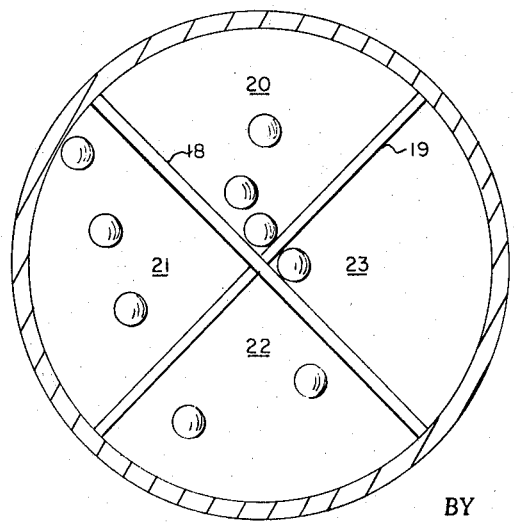
FIG. 3 is a transverse sectional view taken on the line 3—3 of FIG. 2.

Indicating apparatus constructed in accordance with the disclosed embodiment of the invention comprises a generally cylindrical housing 1 composed of a preferably clear thermoplastic material and having an annular sidewall 2 and parallel top and bottom walls 3 and 4, respectively.

Within the housing 1 is a disc-shaped partition 5 which parallels the walls 3 and 4 and may be secured to and supported by a plurality of radially inwardly directed fingers 6 which, in turn, are secured to the inner surface of the wall 2. The partition 5 provides an upper chamber 7 between the partition and the top wall 3 and an intermediate chamber 8 below the partition 5. The upper surface of the partition 5 provides a floor which is concave upwardly and, preferably, is of conical configuration having a small depression or dimple at its center 9. Fixed to the upper surface of the disc 5 is a pair of ramps 10 and 11 which extend in prolongation of one another from the center 9, each of the ramps having a grooved runway 12. The ramps 10 are inclined upwardly and radially outwardly from the center 9 and adjacent their upper and outer ends are provided with openings 13 for a purpose presently to be explained.

Supported in the housing 1 beneath the partition 5 is a parallel, similar partition 15 which has an upwardly concave surface or floor 15 of preferably conical shape. The floor has a depression or dimple at its center 16. The partition 14 is supported above the level of the lower wall 4 so as to provide a lower chamber 17 in the housing 1. The partition 14 is supported on cross members 18 and 19 which divide the chamber 17 into four segment-shaped compartments 20, 21, 22 and 23.

Carried by the partition 14 is a pair of ramps 24 and 25, similar to the ramps 10 and 11, and which extend in prolongation of one another on opposite sides of the center 16. The ramps 24 and 25 are normal to the ramps 10 and 11 and each of the ramps 24 and 25 has a grooved runway 26 that terminates at the upper radially outer end in an opening 27.

The openings 27 are so located that the left-hand opening 27 communicates with the compartment 21 and the right-hand opening 27 communicates with the compartment 23. The openings 13 associated with the ramps 10 and 11 communicate with the compartments 20 and 22, respectively, via vertical tubes 28 which are aligned with the opening 13. The partition 14 is provided with notches (not shown) in which the tubes 28 are accommodated.

On each of the partitions 5 and 14 is accommodated a plurality of rotatable elements such as balls 29. Due to the conical floors of the respective partitions the balls have a tendency to move to the center of their respective partitions so that one ball always will occupy the center depressions 9 and 16 so as to be in a position to roll onto and up either of the associated ramps.

To condition the apparatus for operation, the housing 1 may be positioned in a fixed, locked container (not shown) that may be located in the trunk of a vehicle. A plurality of balls 29 will be supported on the partition 5, a plurality of balls 29 will be supported on the partition 14, and no balls will be in the lower chamber 17. The housing 1 should be so positioned that the ramps 11 and 12 extend parallel to the longitudinal axis of the vehicle, indicated by the arrow A, whereupon the ramps 24 and 25 will extend transversely of the longitudinal axis of the vehicle.

When the apparatus is positioned in the manner described, sudden acceleration of the vehicle will cause a ball 29 to climb the ramp 11 and pass through the opening 13 into the compartment 22. Rapid deceleration of the vehicle will cause the ball 29 to climb the ramp 10 and pass through the opening 13 into the compartment 20. Should the vehicle be turned to the right at an excessive rate of speed, a ball 29 will climb the ramp 24 and pass through the opening 27 into the compartment 21. Similarly, turning of the vehicle to the left at a rapid rate of speed will cause a ball 29 to climb the ramp 25 and pass into the compartment 23 via the opening 27. Each time a ball leaves the center of the associated partition, another ball will take its place due to the concave surface of the ramp.

The size and weight of the balls 29 and the inclination of the associated ramps are so selected that the acceleration and deceleration forces require to displace a ball from the center of the associated partition into the appropriate ones of the two compartments make it possible to compute the rate of acceleration and deceleration of the vehicle. Similar considerations enable the rate at which the vehicle is turned either to the left or the right to be computed.

To recondition the apparatus for use, the housing 1 may be turned upside down, whereupon the balls in the several compartments will reenter the upper and intermediate chambers via the appropriate openings 13 and 27. To avoid inadvertent restoration of balls from the upper and intermediate chambers into the lower chamber when the housing is returned to its upright position, deflectors or baffles 30 overlie the openings 13 and 27.

The disclosed embodiment is representative of a presently preferred form of the invention, but is intended to be illustrative rather than definitive thereof.

I claim:

1. Inertia-operated indicating apparatus comprising a hollow body having a top wall, a bottom wall, and a sidewall; partition means in said body defining upper and lower chambers, said partition means defining a floor for the upper chamber and said bottom wall defining a bottom for said lower chamber; a first ramp in said upper chamber and inclined upwardly from said floor; a second ramp in said upper chamber extending in prolongation of said first ramp and inclined upwardly from said floor; at least one rotatable element normally supported on said floor in a position to roll onto and up either of said ramps, each of said ramps having an opening adjacent its upper end in communication with said lower chamber; and means dividing said lower chamber into a plurality of separate compartments, one of said compartments being in communication with the opening in one of said ramps and another of said compartments being in communication with the opening in the other of said ramps.

2. Apparatus as set forth in claim 1 wherein said partition is concave upwardly and has its lowest point at the center of said partition.

3. Apparatus as set forth in claim 1 wherein each of said ramps extends outwardly from the center of said floor.

4. Apparatus as set forth in claim 1 including second partition means interposed between said bottom wall and the first mentioned partition means and defining an intermediate chamber between said upper and lower chambers, said second partition means defining a floor for said intermediate chamber; first and second ramps in said intermediate chamber corresponding to the construction and arrangement of the first and second ramps in said upper chamber except that the ramps in said intermediate chamber extend normal to the ramps in said upper chamber; and at least one rotatable element normally supported on the floor of said intermediate chamber and in a position to roll onto and up either of the ramps in said intermediate chamber, each of the ramps in said intermediate chamber having an opening adjacent its upper end, each of the last-mentioned openings being in communication with a different compartment in said lower chamber.

5. Apparatus as set forth in claim 4 wherein each of said ramps in said intermediate chamber extends outwardly from the center of the floor thereof.

6. Inertia-operated indicating apparatus comprising a hollow body having a bottom wall; a first partition in said body substantially parallel to said wall; a second partition in said body substantially parallel to said first partition and spaced therefrom and from said bottom wall, said partitions and said bottom wall defining upper, intermediate and lower chambers in said body; a pair of ramp members in said upper chamber and extending in prolongation of one another on opposite sides of and upwardly from the center of said first partition; a second pair of ramp members in said intermediate chamber and extending in prolongation of one another on opposite sides of and upwardly from the center of said second partition, the ramp members of the second chamber being normal to the ramp members of the first chamber; at least one rotatable element normally supported at the center of said first partition in a position to roll onto and up either of the ramp members in said first chamber; and at least one rotatable element normally supported at the center of said second partition in a position to roll onto and up either of the ramp members in said intermediate chamber.

7. Apparatus as set forth in claim 6 including openings in all of said ramp members adjacent their upper ends for the accommodation of the associated rotatable elements.

8. Apparatus as set forth in claim 7 including means in communication with each of said openings and said lower chamber and through which said elements may pass to said lower chamber.

9. Apparatus as set forth in claim 8 including means in said lower chamber for dividing the latter into four compartments, there being one of said compartments for each of said communicating means.

10. Apparatus as set forth in claim 7 including baffle means overlying each of said openings.

* * * * *